United States Patent [19]

Iino et al.

[11] Patent Number: 4,862,596
[45] Date of Patent: Sep. 5, 1989

[54] APPARATUS FOR MEASURING SIZE OF SEAMED PORTION OF CANS

[75] Inventors: Toshio Iino; Takayuki Kai, both of Ibaraki, Japan

[73] Assignee: Daiwa Can Company, Limited, Tokyo, Japan

[21] Appl. No.: 183,156

[22] Filed: Apr. 19, 1988

[30] Foreign Application Priority Data

Jun. 4, 1987 [JP] Japan .................. 62-139011

[51] Int. Cl.⁴ .............................. G01B 7/02
[52] U.S. Cl. ...................... 33/522; 33/548; 33/552
[58] Field of Search .............. 33/548, 549, 552, 553, 33/554, 555, 558, 560, 557, 522

[56] References Cited

U.S. PATENT DOCUMENTS 3,769,713 11/1973 Norman .................. 33/548 X
4,402,139 9/1983 Noyes .................... 33/522

FOREIGN PATENT DOCUMENTS 60-165501 8/1985 Japan .
60-203805 10/1985 Japan .
60-247111 12/1985 Japan .

Primary Examiner—William A. Cuchlinski, Jr.
Assistant Examiner—Thomas B. Will
Attorney, Agent, or Firm—Wenderoth, Lind & Ponack

[57] ABSTRACT

An apparatus for simultaneously measuring at least the width and thickness of a seamed portion of a can at the same point on the seamed portion. The apparatus comprises a measurement base for receiving the seamed portion of the can thereon, and a reference block secured to the measurement base the reference block including a reference contact portion to contact the outer surface of the seamed portion. A device for measuring the width of the seamed portion is mounted on the reference block and includes a measurement pin cooperating with the measurement base to clamp the seamed portion in the vertical direction. A device for measuring the thickness of the seamed portion is mounted on the reference block and includes a measurement block cooperating with the reference contact portion to clamp the seamed portion laterally. The apparatus may further comprise a device for measuring the can height and/or a device for measuring the countersink depth.

8 Claims, 12 Drawing Sheets

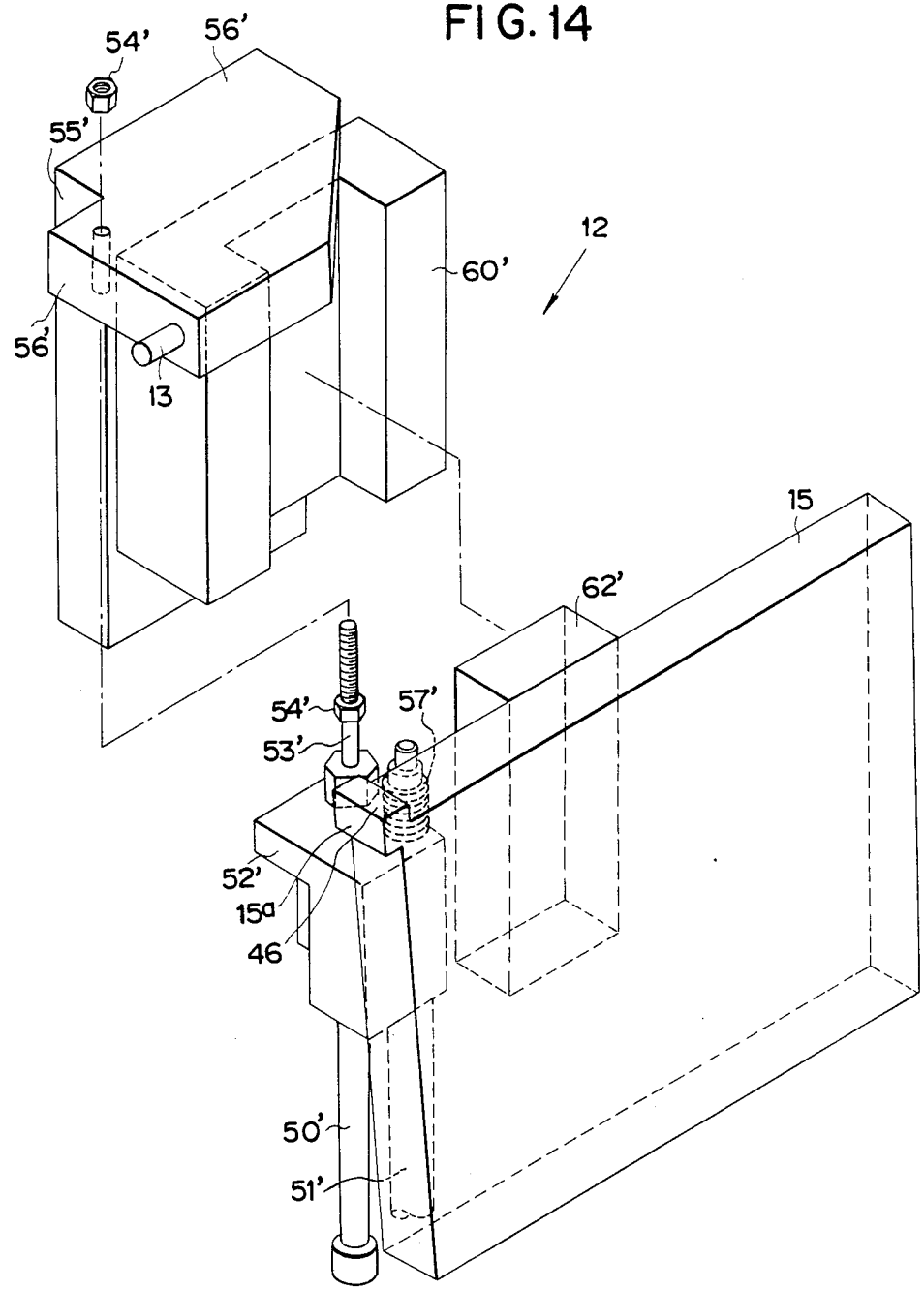

APPARATUS FOR MEASURING SIZE OF SEAMED PORTION OF CANS

BACKGROUND OF THE INVENTION

1. Field of the Invention:

This invention relates to an apparatus for measuring the size of a seamed portion of a can, e.g., a three-piece can or a D & I can, constituted by seaming edges of a can end and a can body.

2. Description of the Prior Art:

After a can which is either small or large in size has been filled, an edge of the opening of the can body is sealed with a can end. The maintenance of the size of the seamed portion of the can is a factor for determining the seal property of the can, and it is one important control item for maintaining the quality of the can contents.

The sectional views of FIGS. 6 and 7 illustrate a process of seaming and a resulting seamed portion. As shown in FIG. 6, a curled portion 2a of a can end 2 is curled into the inside of a flange portion 1a of a can body 1 by a first seaming roll. Then, as shown in FIG. 7, the portions 1a and 2a are tightly pressed together by a second seaming roll to obtain a seamed portion 3. The seamed portion 3 is formed such that it is inclined outwardly from an extension X—X of the can body 1 by a small angle $\theta$ (about 4 degrees) for the removal of the processing tool. Further, an upwardly open, shallow dish-like countersink 4 is formed on the inner side of the seamed portion 3.

For inspecting the quality of the seal of the seamed portion 3, tests are conducted from many aspects. More specifically, the thickness T and width W of the seamed portion 3 and the depth C of the countersink, as shown in FIG. 8, are measured. Further, the can height H (not shown) is measured. These measurements are performed for the following reasons. The thickness T of the seamed portion is increased if the pressure applied in the press operation is insufficient. If the pressure applied is excessive, on the other hand, a crack is generated in the seamed portion 3, so that the thickness is reduced. In either case, the seal is imperfect. As for the width W of the seamed portion, it is reduced if the pressure applied in the press operation is insufficient. If the curled portion 2a as shown in FIG. 7 is insufficiently curled, on the other hand, the width of the seamed portion is increased. In either case, the seal is imperfect. As for the depth C of the countersink, like the width of the seamed portion, it is increased if the curl of the curled portion 2a is insufficient, while it is reduced if the curl is excessive. In either case, the seal is imperfect. As for the can height H, its variations affect T, W and C, so that it also constitutes an item to be checked.

The thickness T and width W of the seamed portion, the depth C of the countersink and the can height H are checked for the reasons noted above, and cans for which these values exceed certain predetermined values, particularly the values of T and W, are rejected.

Apparatus for measuring the values noted above include an apparatus for measuring th width of a seamed portion as disclosed in Japanese Patent Laid-Open Publication No. 165501/1980, an apparatus for measuring the thickness of a seamed portion as disclosed in Japanese Patent Laid-Open Publication No. 203805/1985 and an apparatus for measuring the countersink depth of a can end as disclosed in Japanese Patent Laid-Open Publication No. 247111/1985.

A summary of the construction and function of these apparatuses will be described in reference to FIGS. 9 to 11.

FIG. 9 is an elevational view showing the apparatus for measuring the width of a seamed portion as disclosed in Japanese Patent Laid-Open Publication No. 165501/1985. This apparatus uses a micrometer 70 provided with a frame 71 and a spindle 72, which clamp a seamed portion during measurement. The spindle 72 of the micrometer 70 is vertically moved by an air cylinder 73. The whole micrometer 70 is downwardly moved by an air cylinder 74 while it is upwardly moved by a spring 82. Further, the micrometer 70 and air cylinder 74 are moved horizontally outwardly (i.e., in the direction of arrow Y) by an air cylinder 75, while they are moved toward the can (i.e., in the direction of arrow Z) by a spring 83. Since the apparatus has the structure as described above, by setting a can 5 to be measured on a clamp base and releasing the operation of the air cylinder 75, the frame 71 of the micrometer 70 is moved horizontally by the spring 83 to be brought into contact with the can body below the seamed portion of the can 5. Then, by stopping the operation of the air cylinder 74, the frame 71 is moved upwardly by the spring 82 to be brought into contact with the lower end of the seamed portion of the can 5. Subsequently, the spindle 72 is lowered by operating the air cylinder 73 to clamp the seamed portion between the frame 71 and the spindle 72 for measuring the width of the seamed portion. Defects that are involved with this apparatus will be described later. FIG. 10 is an elevational view showing the apparatus for measuring the thickness of a seamed portion as disclosed in Japanese Patent Laid-Open Publication No. 203805/1985. This apparatus again uses a micrometer 70 provided with a frame 71 and a spindle 72, which clamp a portion being measured. The spindle 72 is moved laterally by an air cylinder 76. The whole micrometer 70 is tiltably suspended by a shaft 79, so that the frame 71 and spindle 72 can be tilted in accordance with the small angle $\theta$ of the seamed portion noted above. The whole micrometer 70 may also be moved horizontally toward the can 5 by an air cylinder 77 and outwardly by a spring 84. The micrometer 70 and air cylinder 77 are further moved vertically by an air cylinder 78. With the apparatus of this construction, the can 5 being measured is set on a clamp base, and the air cylinder 78 is operated to lower the frame 71 of the micrometer 70 to a position close to the can end as shown in FIG. 10. Then, by stopping the operation of the air cylinder 77, the micrometer 70 is moved horizontally by the spring 84 to bring the frame 71 into contact with the inner side of the seamed portion. At this moment, the whole micrometer 70 is tilted by the shaft 79. Subsequently, the air cylinder 76 is operated to move the spindle 72 laterally to clamp the seamed portion between the frame 71 and the spindle 72 for measuring the thickness of the seamed portion. Defects that are involved with this apparatus will be described later.

FIG. 11 is an elevational view showing the apparatus for measuring the countersink depth as disclosed in Japanese Patent Laid-Open Publication No. 247111/1985. This apparatus uses a micrometer 70, which is provided with a frame 71 to be held in contact with the top of the seamed portion and a vertically movable spindle 72. The whole micrometer 70 is vertically moved by an air cylinder 80. The whole micrometer 70 and air cylinder 80 may be moved horizontally toward the can 5 by an air cylinder 81 and outwardly by a spring 85. With the apparatus of this construction, the can 5 to be measured is secured to a clamp base, and then the air cylinder 81 is operated to bring the whole micrometer 70 to a position above the can. Then, the air cylinder 80 is operated to bring the frame 71 into contact with the top of the seamed portion and bring the spindle 72 into contact with the outer surface of the can end. Subsequently, by releasing the operation of the air cylinder 81, the whole micrometer 70 is moved horizontally outwardly (i.e., in the direction of arrow S) by the spring 85, and the spindle 72 is slid into the deepest part of the countersink, whereby the countersink depth is measured. Defects that are involved with this apparatus will be described later.

Several apparatuses are well known and used as an apparatus for measuring the can height. They are not described in detail here, but an apparatus as shown in FIG. 5 will be described as an example. The apparatus has a beam 37, which extends from the upper end of a support 36 extending upright from a base, on which the can to be measured is placed. An air cylinder 38 and magnetic scale 39 are secured to the beam 37 such that they extend vertically. A can height measurement member 18 is mounted on the lower end of the scale 39 such that it is in contact with the end of a rod 40 of the cylinder 38. When the rod 40 is moved vertically with the operation of the cylinder 38, the measurement member 18 is also moved vertically. A cable 27 of the scale 39 is connected to the measurement unit, and the measured can height is transmitted to the unit.

The apparatuses described above, particularly those disclosed in the three publications noted above, are excellent apparatuses, provided with spring mechanisms for bringing the micrometer into contact with a portion under measurement slowly without causing damage to the can. In these apparatuses, however, defects are encountered in that measurements of individuals items of data performed in seperate steps.

Recently, cans and canned goods have been manufactured at a production rate as high as 400 to 500 cans per minute. Therefore it is necessary to check the thickness and width of the seamed portion frequently, and to eleminate the cause of a defect as soon as the defect is found. To determine the cause, it is necessary to know the values of the thickness and width of the seamed portion of the can under measurement at the same point of the seam. To eliminate the cause, changes in the counterdepth and/or can height are considered due to changes in the size of the seamed portion.

With the prior art measurement apparatus, however, a measurement of only a single item can be performed with one apparatus. This means that the can being measured has to be moved for each measurement; for instance, after measurement of the thickness T of the seamed portion with a seamed portion thickness measurement apparatus, in order to measure the width W, the can has to be moved to the station where there is a seamed portion width measurement apparatus. Therefore, the overall measurements require a great deal of manhours. Further, since the prior art measurement apparatus each permits measurement of only a single item, it is impossible to obtain measurement data about the same point of the seamed portion for the individual measurement items, that is, it is impossible to obtain data of the thickness, width, etc. with respect to the same part of the seamed portion. Therefore, when determining the cause of a defect, the correlation of the individual measurement items is inevitably looked at by examining the correlation of average values obtained for each measurement item. If it is possible to obtain data for each item with respect to the same part of the seamed portion, it is effective to compare each item data to detect items of increased values and items of reduced values. However, correlation can not be obtained among data obtained for different parts of the seamed portion because of waving, eccentricity, inclination, etc. of the seamed portion. Hence, it is usual to check the increasing and reducing tendencies of average value data and to check the correlation of these data. However, it is time-consuming to obtain average values, and the correlation based on the average values is inaccurate, thus frequently resulting in the incomplete elimination of the cause of a defect.

If it is possible to obtain data as noted above, particularly at least width and thickness data, with respect to the same part of the seamed portion of the can and simultaneously, it would greatly contribute to the can quality control. No apparatus which can meet such criteria has heretofore been provided.

With the prior art apparatuses for measuring the thickness, width, etc. of the seamed portion, measurements are performed separately with respect to some parts of the seamed portion of the can, so that data with respect to the same part can not be obtained even if those apparatus are combined.

OBJECT OF THE INVENTION

Accordingly, the primary object of the present invention is to provide an apparatus which can solve the problems described above, especially an apparatus that automatically obtains seamed portion thickness and width data with respect to the same part of a seamed portion of a can being measured.

SUMMARY OF THE INVENTION

In accordance with the present invention, there is provided an apparatus for measuring the size of a seamed portion of a can comprising a measurement base, a reference block or member, a device for measuring the width of a seamed portion and a device for measuring the thickness of the seamed portion.

The measurement base is disposed horizontally and includes a base portion having an upper reference surface. A can with a seamed portion to be measured is set downwardly on the upper surface. The base is provided with a slit-like notch.

The reference block includes a reference contact portion projecting above the upper surface of the measurement base, and is held in contact with the outer surface of the seamed portion being measured. A contact surface of the reference contact portion is inclined by an angle substantially equal to the inclination angle of said seamed portion. The reference block is secured to the measurement base such that the block is on an extension of a longitudinal center line of the slit-like notch and a flat end surface of the reference contact portion serves as a contact surface facing the slit-like notch.

The device for measuring the width of the seamed portion is mounted on the reference block and includes a measurement member or pin capable of being moved vertically above the reference contact portion to clamp the seamed portion between itself and the base.

The device for measuring the thickness of the seamed portion is mounted on the reference block, and includes a measurement block or member having a portion projecting above the upper surface of the measurement base to contact the inner surface of the seamed portion being measured. The measurement block or member is movable through said slit-like notch in the direction perpendicular to the reference contact portion.

The contact point between the measurement pin and the seamed portion, the contact point between the flat end surface of the reference contact portion and the seamed portion, and the contact portion between the measurement block and the seamed portion are found in the same plane.

In accordance with the present invention, there is also provided an apparatus comprising, in addition to the width and thickness measuring devices noted above, a device for measuring the can height and/or a device for measuring the countersink depth.

The device for measuring the can height is provided on the measurement base and includes a measurement member movable vertically.

The device for measuring the countersink depth is provided on the lower surface of the measurement base and includes a measurement member provided at an upper end of the device, the measurement member being vertically movable and tiltable and projecting above the upper surface of the measurement base to be in contact with the countersink of the seamed portion under measurement.

The individual measuring devices are arranged such that the contact point between the measurement pin and the seamed portion, the contact point between the flat end surface of the reference contact portion and the seamed portion, and the contact point between the measurement block and the seamed portion, as well as the contact portion between the measurement member of the can height measuring device and a can are found in the same plane. This apparatus permits more satisfactory measurements.

The term "same plane" more specifically means a plane through the diametrical section of the can having the contact points therein.

The countersink depth measuring device is disposed such that it is close to the reference contact portion of the reference block but such that it will not obstruct the movement of the measurement block of the seamed portion thickness measuring structure.

According to the present invention, unlike the prior art, the cumbersomeness of moving the can being measured for each measurement can be eliminated. Also, the measurement of each of the individual items can be effected at one time, thus greatly reducing the time required for the measurements.

Further, since the measurements, with respect to the individual measurement items, can be performed simultaneously at a point permitting a correlation of the measurement values of the individual items, it is possible to determine accurately and quickly the state of the seamed portion, i.e., whether or not the seamed portion is good, and the cause of the defectiveness, if any, of the seam.

Furthermore, the present invention permits simultaneous measurements with respect to the individual measurement items with a can having any diameter. Moreover, with the apparatus according to the present invention connected to the computer and display unit, it is possible to readily display, print out and record the obtained data. Further, since necessary data can be simultaneously input, the record data can be readily stored and controlled, thus improving the efficiency of measurement.

The above-mentioned and other objects and features of the invention will become apparent from the following detailed description taken in conjunction with the drawings which indicate an embodiment of the invention.

Figure 1:
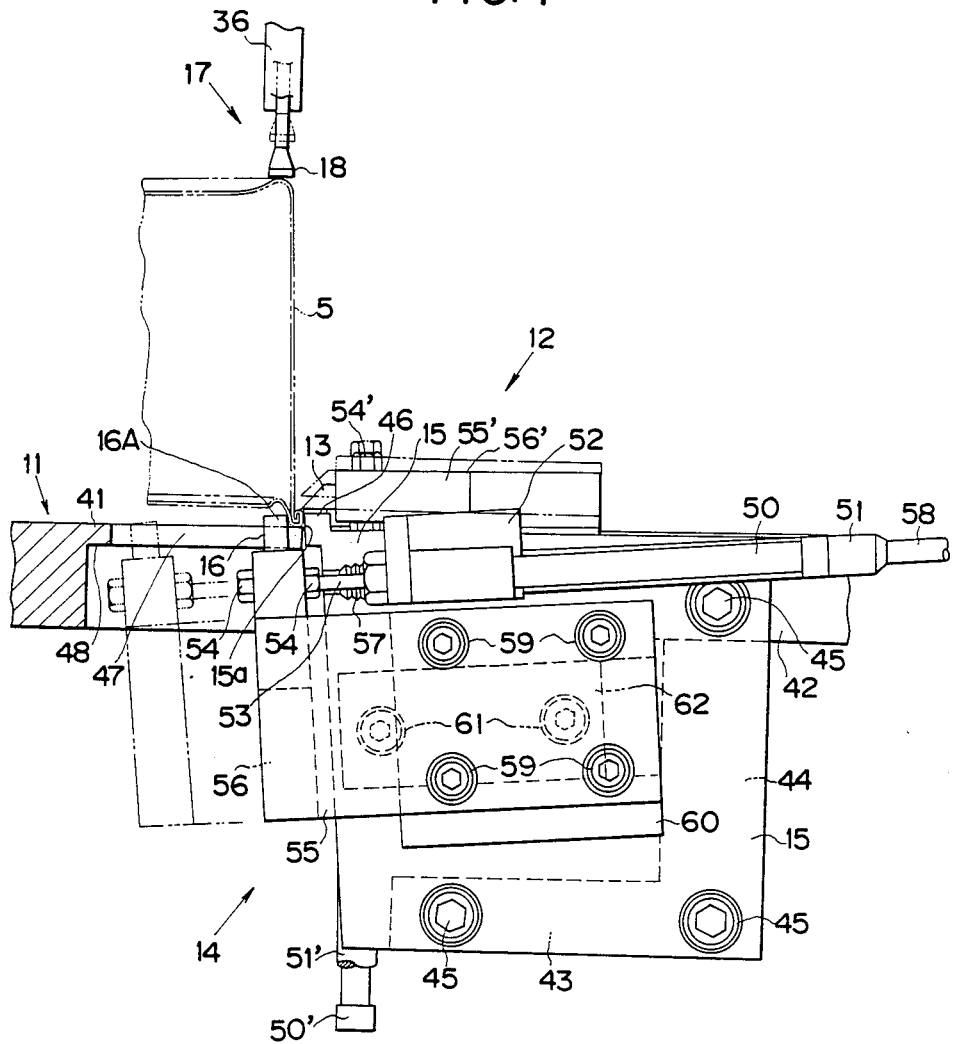
FIG. 1 is a fragmentary left side view showing an apparatus according to the present invention provided with devices for measuring the seamed portion width, seamed portion thickness, countersink depth and can height.
Figure 2:
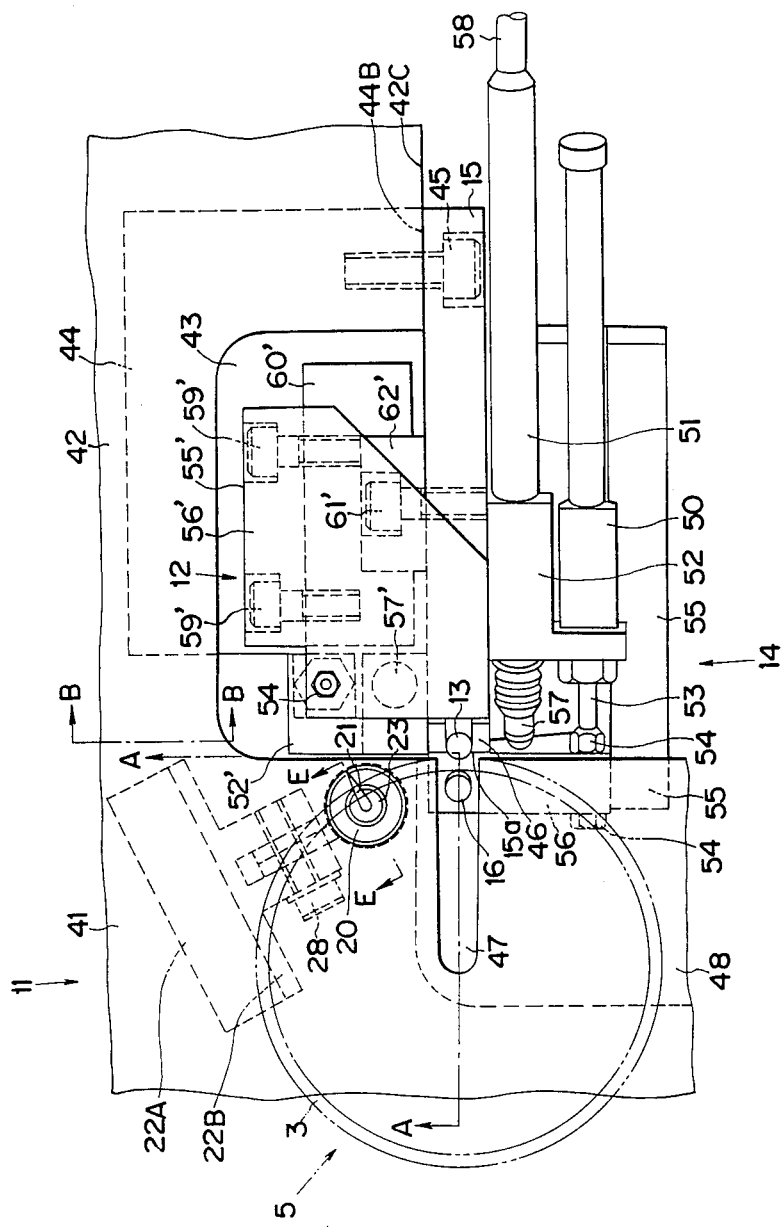
FIG. 2 is a plan view showing the same apparatus.
Figure 3:
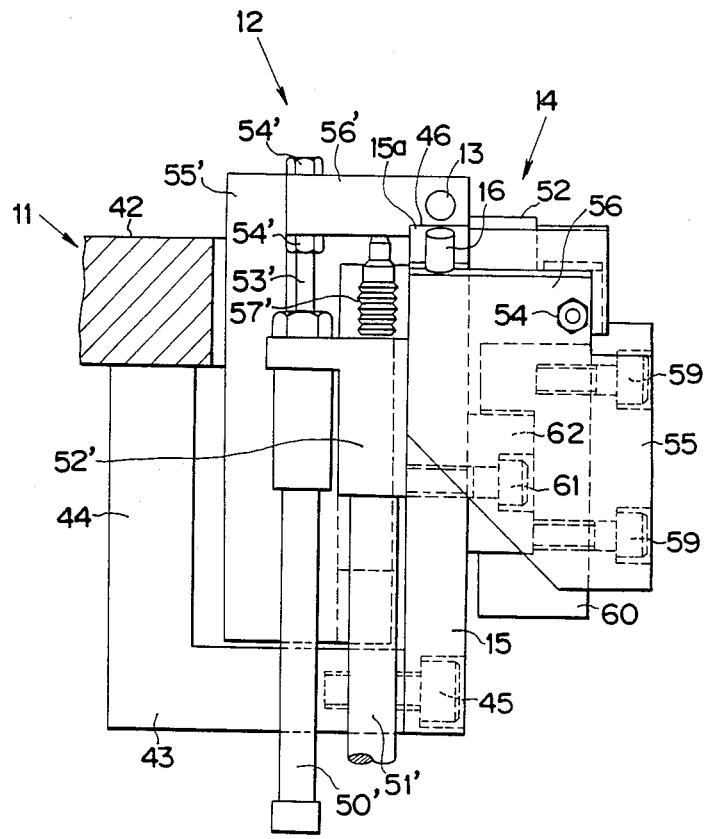
FIG. 3 is a front view showing the same apparatus.

A measurement base shown in FIG. 1 is shown as a section taken along line A—A in FIG. 2; a device for measuring the can height is omitted in FIG. 2; and the measurement base shown in FIG. 3 is shown as a section taken along line B—B in FIG. 2 while the devices for measuring the can height and countersink depth are omitted in FIG. 3.

Figure 4:
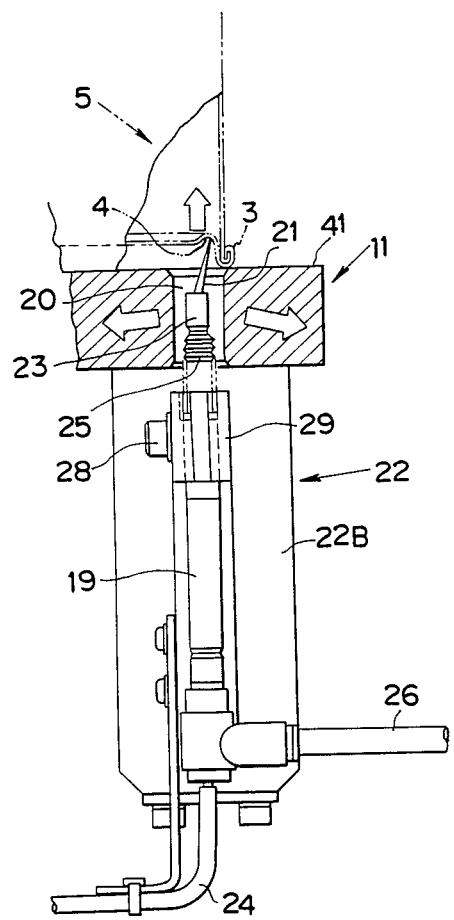
Figure 5:
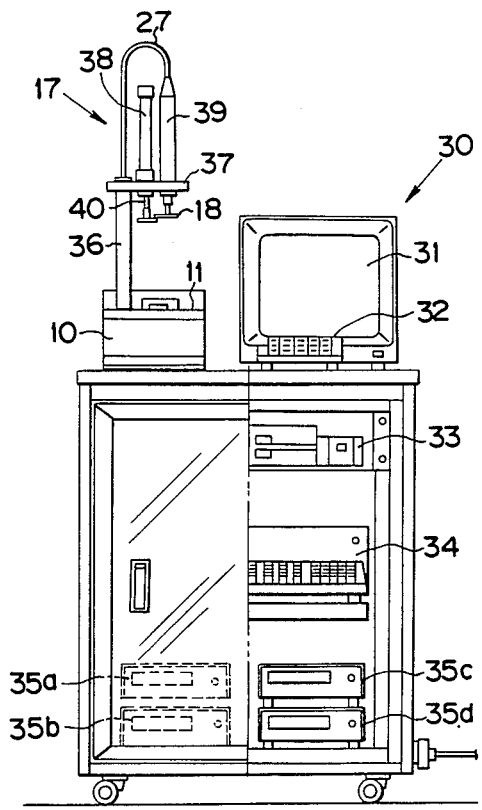
Figure 6:
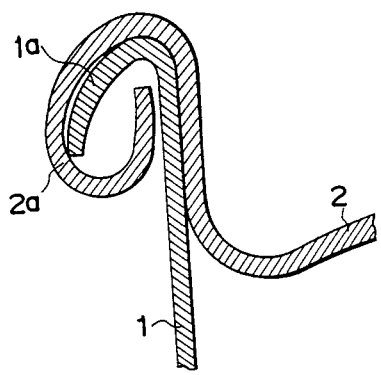
Figure 7:
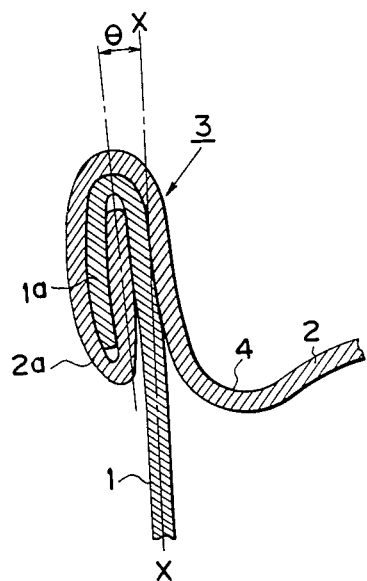
Figure 8:
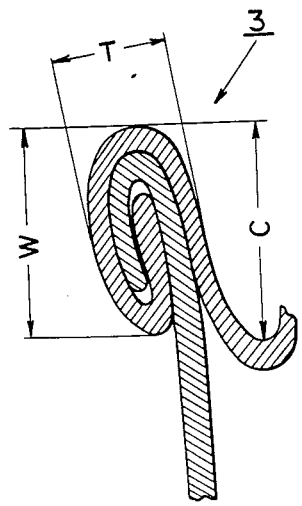
Figure 9:
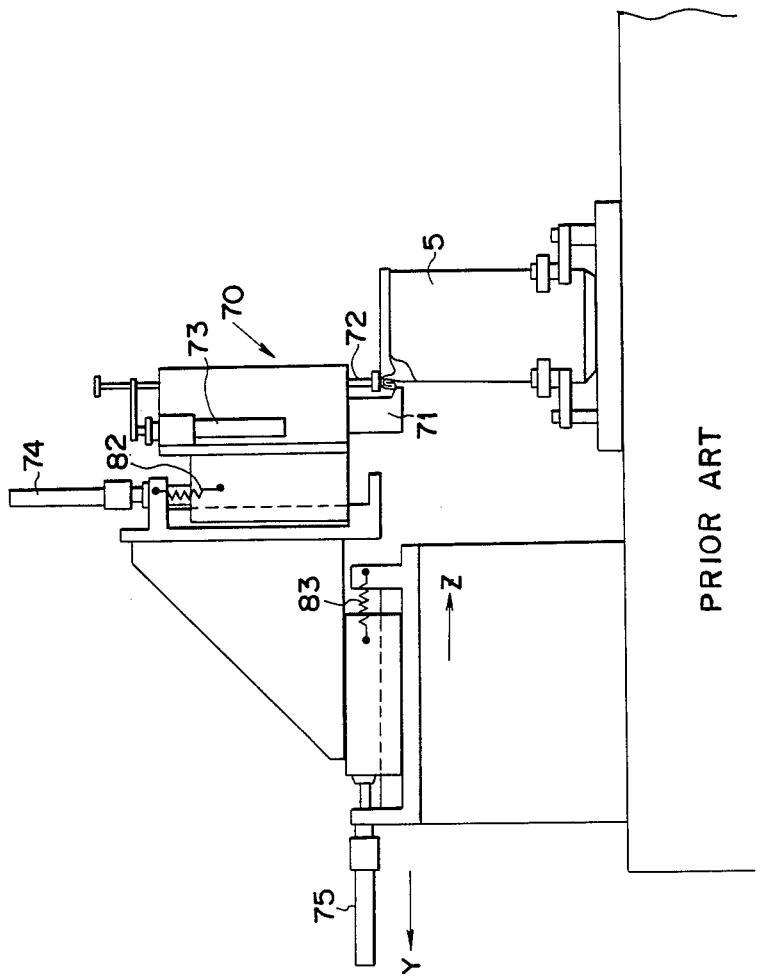
Figure 10:
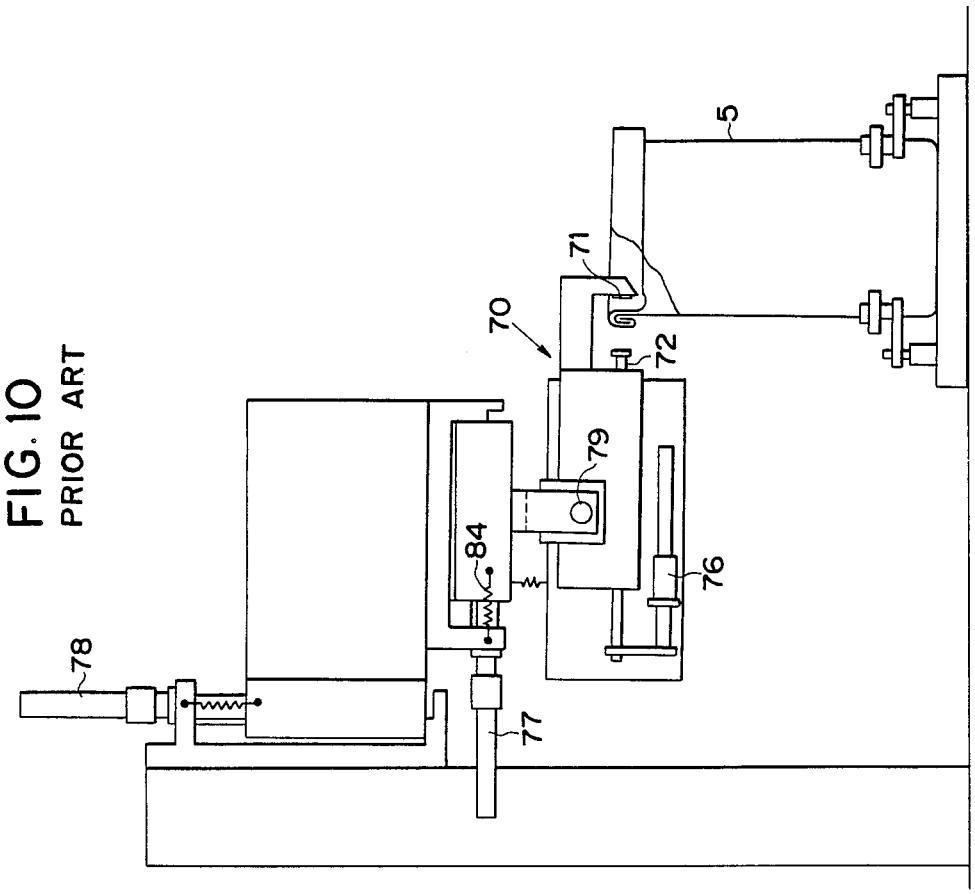
Figure 11:
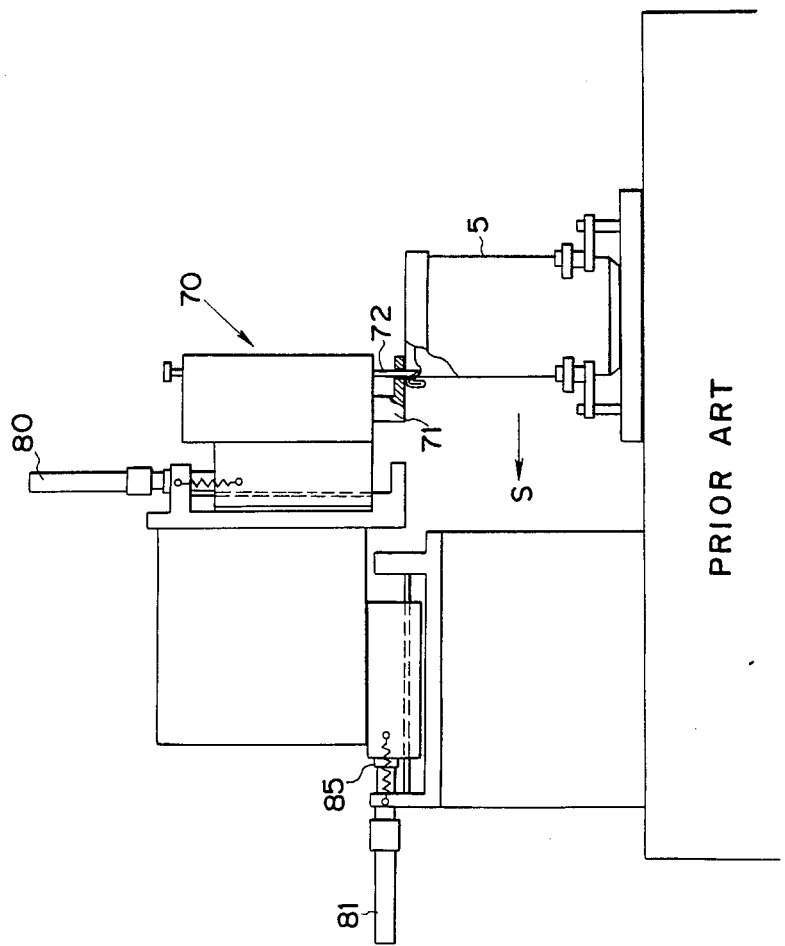
Figure 12:
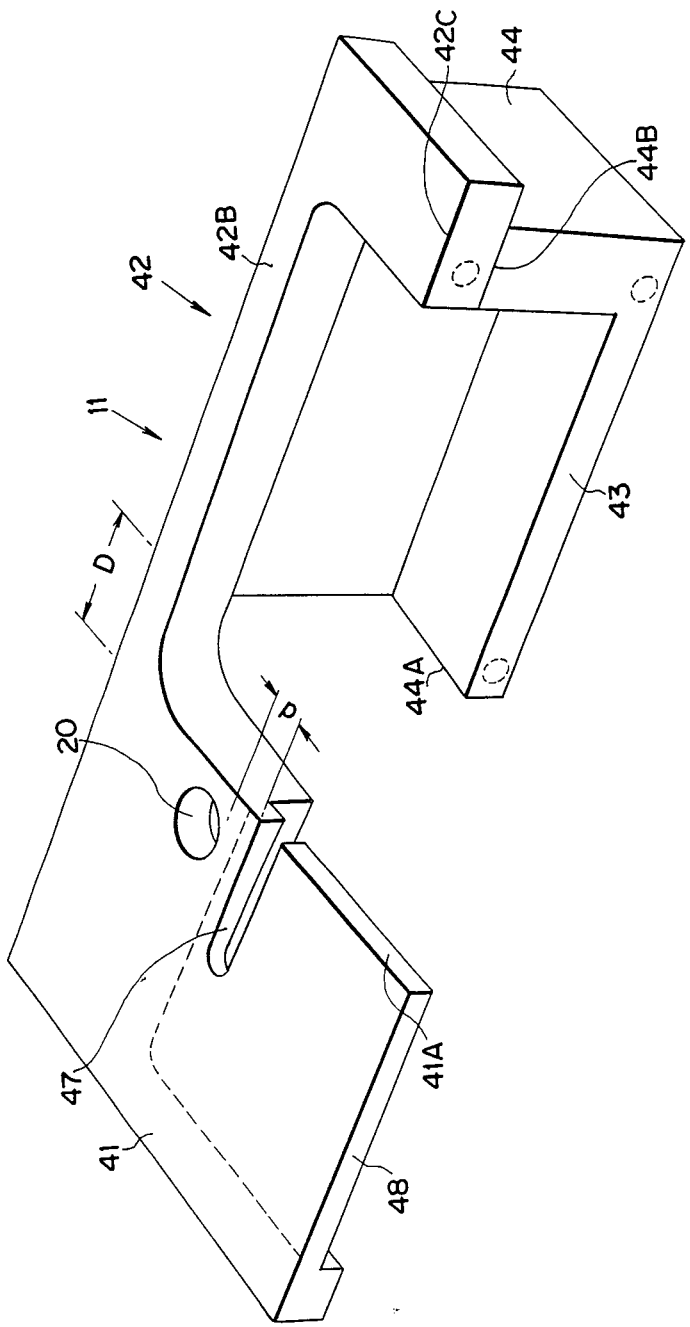
Figure 13:
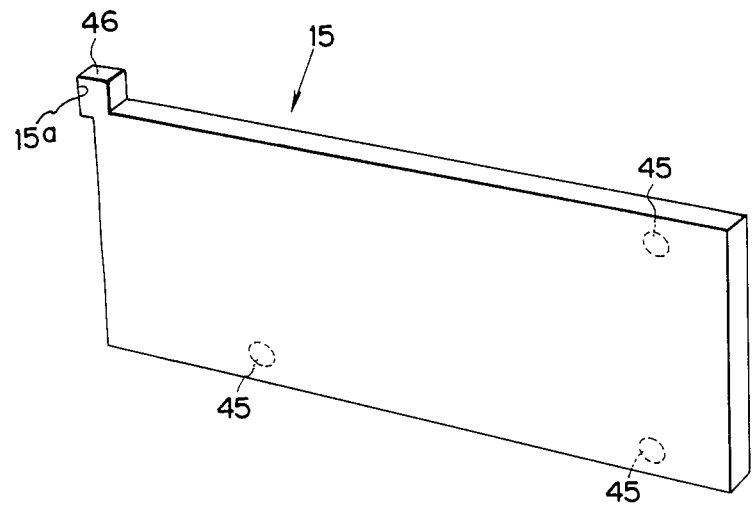
Figure 15:
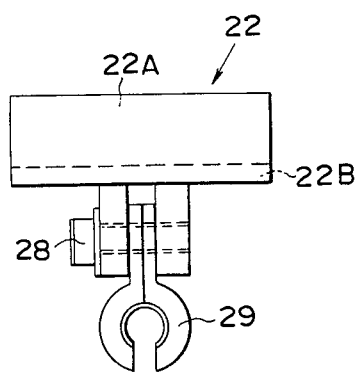

FIG. 4 is a side view showing the device for measuring the countersink depth as a section taken along line E—E in FIG. 2;

FIG. 5 is an elevational view showing an outer can size measurement apparatus combined with a seamed portion size measurement apparatus;

FIG. 6 is a sectional view illustrating a seaming process;

FIG. 7 is a sectional view showing a seamed portion;

FIG. 8 is a sectional view showing a position of measurement of a seamed portion;

FIGS. 9 to 11 are elevational views respectively showing prior art apparatuses for measuring the width and thickness of a seamed portion and the countersink depth, respectively;

FIG. 12 is a perspective view showing a measurement base in the apparatus according to the present invention;

FIG. 13 is a perspective view showing a reference block;

FIG. 14 is an exploded perspective view illustrating the structural relation between the device for measuring the width of the seamed portion and the reference block; and FIG. 15 is a schematic plan view showing a securement member in the device for measuring the countersink depth.

DETAILED DESCRIPTION OF THE PREFERRED EMBODIMENT

An embodiment of the apparatus according to the present invention will now be described, in which devices for measuring the thickness and width of a seamed portion, the countersink depth and the can height are all provided.

FIG. 12 is a perspective view showing a measurement base 11. This measurement base 11 is disposed horizontally, and it roughly comprises a base portion 41 for supporting a can being measured in a state in which the seamed portion thereof of the can is down (the upper surface of the base portion constituting a reference surface for measurements by the seamed portion width, countersink depth and can height measuring devices to be described later) and an L-shaped portion 42 extending from the base portion 41 and having an inverted L-shaped form. An L-shaped block 44 provided with a bottom plate 43 is secured to the underside of the L-shaped portion 42. The L-shaped portion 42 and L-shaped block 44 define a space open on three sides, i.e. the upper side, the side near the base portion and the side opposite to a longitudinal portion 42B of the L-shaped portion 42. The inner end surface 41A of the base portion 41 and the inner end surface 44A of the L-shaped block 44 are spaced apart by a predetermined distance D. The space corresponding to this distance is provided for the disposition of a measurement pin 13, a magnetic scale 51', an air cylinder 50', etc. in the seamed portion width measuring device to be described later. The base portion 41 has a slit-like notch 47 open to the inner end surface 41A (the notch having a length of 3.6 cm and a width of 0.6 cm in this embodiment although these dimensions are by no means limitative) and a through hole 20 bored in the vicinity of the inner end surface 41A and notch 47 and on the side of the notch 47 opposite to a reduced thickness portion 48 to be described later (the through hole having a diameter of 1.2 cm in this embodiment, although not limitative). The notch 47 serves as a passage for a measurement block or member 16 of the seamed portion thickness measuring device to be described later. The through hole 20 is for a measurement member 21 of the countersink depth measuring device to be described later. Preferably the extension of the outer edge 42C of the L-shaped portion 42 (which also constitutes the outer edge 44B of the L-shaped block 44 and the outer edge of the bottom plate 43) extends at a point between the notch 47 and the through hole 20, but not necessarily mid way between the notch 47 and the through hole 20. In the case of FIG. 2, it is slightly closer to the notch 47. The distance between the slit 47 and the through hole 20 (the distance shown by a reference symbol d in FIG. 12) is as small as possible.

The base portion 41 has a reduced thickness portion 48 as noted above, formed in a part of the base portion 41. This part is on the opposite side of the L-shaped portion 42 and includes the notch 47, so as not to obstruct the movement of an L-shaped slide block 55, a magnetic scale 51 and an air cylinder 50 of the seamed portion thickness measuring device. The reduced thickness portion 48 may be dispensed with by setting the height of the measurement block 16 to be sufficiently large compared to the regular thickness of the base portion 41. It is only necessary that the measurement block 16 be movable through the notch 47, which movement will be described later.

FIG. 13 shows a reference block 15. It comprises a rectangular plate with a reference contact portion 46 protruding from one corner. As will be understood from FIGS. 1 and 2, the reference block 15 is secured by bolts 45 to the L-shaped portion 42 of the measurement base 11 and also to the bottom plate 43 of the L-shaped block 44 along the extension of the longitudinal center line of the notch 47. In FIG. 12, bolt holes are shown by dashed circles at corresponding positions.

The reference contact portion 46 has a flat end surface 15a, inclined by an angle substantially equal to the inclination angle $\theta$ of the seamed portion 3 of the can 5 being measured with respect to a vertical plane, and faces the notch 47 of the measurement base 11. The flat end surface 15a is brought into contact with the outer side of the seamed portion 3 when the can 5 is set on the base portion 41 of the measurement base 11 (see FIG. 1). The overall height of the contact portion 46 may be greater than the width W (see FIG. 8) of the seamed portion 3 being measured, but the portion of the surface 15a that extends above the upper surface of the base portion 41 of the measurement base 11 should not be greater than the width W. That is, the reference block 15 has to be mounted such that the reference contact portion 46 projects to an extent less than the width W (see FIG. 1).

The flat end surface 15A serves as a positioning surface when setting the can 5 on the measurement base 11, and it also acts as a reference surface by the apparatus measuring the thickness of the seamed portion at the time of the thickness measurement.

The device 14 for measuring the thickness of the seamed portion will now be described with reference to FIGS. 1 to 3.

The device 14 mainly comprises a measurement block or member 16 movable through the notch 47 provided in the base portion 41, an air cylinder 50 for moving the measurement block 16, and a magnetic scale unit 51 for measuring the thickness. This device 14 is slidable along a rail 62 secured by bolts 61 to the reference block 15 under the air cylinder 50 and magnetic scale unit 51, in the direction parallel to the longitudinal axis of the air cylinder 50. Device 14 is, of course, driven by the air cylinder 50.

Reference numeral 52 designates a second L-shaped block. The L-shaped block 52 is secured to an upper portion of one side surface of the reference block 15 (on the side opposite to the L-shaped block 44) in a slightly spaced-apart relation to the base portion 41 of the measurement base 11. The air cylinder 50 and magnetic scale unit 51 extend parallel to each other in the longitudinal direction of the reference block 15 and penetrate the L-shaped block 52 (FIG. 2). The air cylinder 50 and magnetic scale unit 51 have their longitudinal axes extending perpendicular to the flat surface 15A of the reference block 15. Since the flat surface 15a is inclined, as noted before, the respective longitudinal axes of the air cylinder 50 and magnetic scale unit 51 are also inclined, as shown in FIG. 1. A rod 53 of the air cylinder 50 projects from the L-shaped block 52 toward the base portion 41, and its free end is secured by bolts 54 to the short side 56 of an L-shaped slide block 55. Further, at a position corresponding to the notch 47 of the measurement base 11, the cylindrical measurement block or member 16 is secured to the upper surface of the short side 56 such that it extends perpendicular to the longitudinal axis of the air cylinder 50, and faces the flat surface 15a of the reference block 15. Thus, the L-shaped slide block 55 is advanced and retreated along the lower surface of the base portion 41 (i.e., the underside of the reduced thickness portion 48 in the illustrated example) with extension and retraction of the rod 53 of the air cylinder 50. The measurement block 16 is correspondingly moved forwards and backwards through the notch 47 in the direction perpendicular to the flat surface 15a while facing the surface 15a. The measurement block 16 has a contact portion 16A, which projects somewhat from the upper surface of the base portion 41 of the measurement base 11 to contact the inner side of the seamed portion being measured. The seamed portion is clamped between the portion 16A and the surface 15a (as will be further described later).

The measurement block 16 may have a height greater than the width W (see FIG. 8) of the seamed portion being measured, but the contact portion 16A, which projects from the upper surface of the base portion 41 of the measurement base, should not be greater than the width W even when the portion 16A projects to the maximum extent (i.e., when it is in contact with the seamed portion inner side (FIG. 1). It should not be too short, however, to permit measurement of the thickness T.

The L-shaped slide block 55 has its long side secured by bolts 59 to a slider 60 provided with a channel-shaped side surface (see FIG. 3). The slider 60 is carried by the rail 62 and slides along the rail 62 in the direction parallel to the longitudinal axis of the air cylinder 50.

In other words, the air cylinder 50 is supported by the L-shaped block 52 secured to the reference block 15, the L-shaped slide block 55 is supported by the rod 53 of the air cylinder 50, and the slider 60 is secured to the block 55 and is slidable along the rail 62 secured to the reference block 15. The extension or retraction of the rod 53 of the air cylinder 50 causes movement of the slider 60 along the rail 62 while simultaneously causing the movement of the L-shaped slide block, and hence the measurement block 16 mounted thereon.

In the magnetic scale unit 51, a movable end portion 57, which extends from the L-shaped block 52 toward the base portion 41, is held in contact with the short side 56 of the L-shaped slide block 55 by air supplied from a ductline 58. Thus, when the slide block 55 is advanced with extension of the rod 53, the movable portion 57 is also advanced, maintaining contact with the short side 56. When the slide block 55 is withdrawn with retraction of the rod 53, the movable portion 57 is also withdrawn. At this time, the air supply cuts off. The result of the measurement by the magnetic scale unit is transmitted via a suitable cable to the measurement unit 35 of the outer size measurement apparatus 30.

Magnetic scales are used as well in the seamed portion width measuring device and countersink depth measuring device to be described later. They are all well known, and have a structure which uses a stack of very small magnets, and in which the number of times the N or S pole of the magnets crosses a sensor is counted to determine the displacement.

The 12 for measuring the width of the seamed portion will now be described with reference to FIGS. 1 to 3 and also to an exploded perspective view in FIG. 14.

Device 12 comprises a measurement pin or member 13 disposed immediately above the reference contact portion 46 of the reference block 15. Pin 13 faces toward the measurement block 16 of the device 14 for measuring the thickness of the seamed portion, as viewed in a plan view (FIG. 2). An air cylinder 50' vertically moves the pin 13, and a magnetic scale unit 51' measures the displacement of the pin.

The air cylinder 50' and magnetic scale unit 51' are equivalent to the air cylinder 50 and magnetic scale unit 51 respectively in the device for measuring the thickness of the seamed portion. The sole difference is that they extend perpendicular to the measurement base 11 (see FIG. 3).

The device 12, as is obvious from FIG. 2, is disposed on the side of the reference block 15 opposite the device 14 for measuring the thickness of the seamed portion, and its major components are accommodated in the space defined by the measurement base 11 and reference block 15.

Reference numeral 52' designates an L-shaped block which corresponds to the block 52. This block 52' is secured to one side surface of the reference block 15 (the side facing the L-shaped block 44) below the reference contact portion 46. The air cylinder 50' and magnetic scale unit 51' are secured to each other in a parallel relation and penetrate the L-shaped block 52'. A rod 53" of the air cylinder 50' projects upwardly from the L-shaped block 52', and its free end is secured by bolts 54' to the short side 56' of an L-shaped slide block 55'. In this condition, the short side 56' extends up to a position immediately above the reference block 15 (see FIG. 3), and the measurement pin or member 13 (having a substantially cylindrical shape with an oblique upper end surface in the illustrated embodiment is secured to the end of the short side 56' immediately above the reference contact portion 46 of the reference block 15 (FIG. 3) such that the longitudinal axis of the pin 13 extends horizontally and crosses the longitudinal axis of the measurement block 16 (FIG. 1).

Similar to the device for measuring the thickness of the seamed portion, the L-shaped slide block 55' is secured to a slider 60', which is driven by the air cylinder 50' for movement along the rail 62' secured to the reference block 15. The slider 60' moves vertically and thus the measurement pin 13 is also moved vertically. That is, it is moved vertically immediately above the reference contact portion 46 with the extension and retraction of the rod 53'.

As will be described later, the measurement pin 13 cooperates with the upper surface (i.e., reference surface) of the base portion 41 to clamp the seamed portion for the measurement of the width W. Since the measurement pin 13 is located immediately above the reference contact portion 46 of the reference block, the measurement of the width W may be performed simultaneously, at the same place along the seamed portion, with the measurement of the thickness T by the measurement block 16 and reference contact portion 46 (i.e., the flat surface 15a), as will be understood from FIGS. 1 and 2.

A device 19 for measuring the countersink depth will now be described with reference to FIGS. 2, 4 and 15.

Device 19 is disposed as close to the reference contact portion 46 of the reference block 15 as possible, to the extent that it will not obstruct the movement of the measurement block 16 of the device 14 for measuring the thickness of the seamed portion.

The device 19 is disposed below the through hole 20 bored in the base portion 41 of the measurement base 11 such that it extends vertically. An accordion portion 25 is connected to an air supply ductline 24, and is extended and retracted by the supply and withdrawal of air into and out of the ductline 24. A pivot bearing 23 extends from the accordion portion 25, and a measurement member 21 extends from the bearing 24. The device 19 further includes a magnetic scale.

The main portion of the apparatus 19 is disposed immediately beneath the through hole 20 such that the measurement member 21 and bearing 23 are inserted and moved vertically through the through hole 20. To this end, an L-shaped securement member 22 is provided.

The securement member 22 consists of a short side 22A secured to the lower surface of the base portion 41 and a depending long side 22B. A clamp 29 is secured by a bolt 28 to the long side 22B. The main portion noted above is held by the clamp 29, and is adapted to be brought to a position immediately beneath the through hole 20 (see FIG. 2).

The measurement member 21 is tiltable by the pivot bearing 23 in the direction of line E—E shown in FIG. 2, i.e., in the radial direction of the can. Further, it can be moved vertically with the extension and retraction of the accordion portion 25. When measuring member 21 projects upwardly from the reference surface of the measurement base to be brought into contact with the countersink (as will be described later in detail).

A magnetic scale unit serves to measure the extent to which the measurement member 21 has moved upwards from the reference point. The unit is provided with a cable 26 for transmitting its data output to a measurement unit 35 of the outer size measurement apparatus 30 (see FIG. 5).

The device for measuring the can height used in accordance with the present invention is well known, and has been described earlier. It is important that this structure should be disposed such that the contact point between the lower surface of the can height measurement member and the can is in the same plane as the contact point between the measurement pin and the seamed portion. The contact point between the reference contact portion and the seamed portion, and the contact between the measurement block and the seamed portion.

FIG. 5 is an elevational view showing the entire outer size measurement apparatus 30 combined with the seamed portion size measurement apparatus 10 noted above. On a desk cabinet, there are provided the seamed portion size measurement apparatus 10 provided with the devices for measuring the thickness and width of the seamed portion, the can height, and the countersink depth, a display unit 31, and a printer 32 with a keyboard. In the desk cabinet, there are accommodated a measurement data storage unit 33, a microcomputer 34 and four measurement units 35a to 35d.

In the outer size measurement apparatus 30, the can being measured is placed on the measurement base 11 at a predetermined position thereon, with the seamed portion down. Then, such data as date and time of sampling, a seamer number, and a seamer head number are entered from the keyboard 32. At the same time, measurement values are received as electric signals from the seamed portion size measurement apparatus 10 to display, print out or record such input values. At the same time, selection of rejected cans may be effected.

The measurements of various items are made with the above apparatus as follows.

The can being measured is set upright on the measurement base 11 with the seamed portion of the can down, such that the seamed portion crosses the notch 47 and the through hole 20. The outer surface of the seamed portion of the can is brought into contact with the reference contact portion 46 of the reference block 15 secured to the measurement base 11. At this time, the measurement pin 13, can height measurement member 18 and measurement block 16 are held at non-obstructive positions, e.g., as shown by imaginary lines in FIG. 13).

Then, the measurement pin 13 is lowered along the can body, and thereby the seamed portion is clamped between the measurement base 11 and the measurement pin 13. In this state, the width of the seamed portion may be measured by the magnetic scale unit 51'. Further, the measurement block 16 is advanced along the notch 47 toward the contact portion 46 of the reference block 15 to clamp the seamed portion between the flat surface 15a of the reference contact portion 46 and the measurement block 16. In this state the thickness of the seamed portion is measured by the magnetic scale unit 51. Further, by clamping the can between the measurement base 11 and the lower surface of the can height measurement member 18, the can height may be measured by the scale unit 39. For the measurement of the countersink depth, the measurement member 21 is first held at a position at a predetermined distance from the upper surface of the measurement base, and then vertical movement and tilting of the measurement member 21 are caused via the accordion portion 25 and bearing 23 to bring the end of the member 21 into contact with the deepest portion of the countersink. In this state, the countersink depth from the upper surface of the measurement base, i.e., the end of the seamed portion, may be determined from the measured distance between the reference point of measurement and the measurement member 21.

The operation will now be described in further detail.

When a power source of the outer size measurement apparatus 30 is closed, the air cylinders of the devices for measuring the thickness and width of the seamed portion and the can height are operated by an air source (not shown), thus moving the measurement pin 13 of the seamed portion width measuring device 12, the measurement block 16 of the seamed portion thickness measuring device 14 and the measurement member 18 of the can height measuring device 17 to non-obstructive positions allowing the can to be set on the measurement base. Further, the measurement member 21 of the countersink depth measuring device 19 is set such that its free end projects slightly above the upper surface of the measurement base 11. Then, the can 5 being measured is set on the measurement base 11 such that the free end of the measurement member 21 of the countersink depth measuring device 19 is in contact with the inner side of the seamed portion 3 of the can 5. Further, the outer side of the seamed portion 3 of the can 5 is urged against the flat surface 15a of the reference block 15. At this time, such data as the sampling time and seamer number are inputted to the computer 34 from the keyboard 32. Subsequently, a switch (not shown) for operating of the seamed portion size measurement apparatus 10 is closed to cause operation of the seamed portion thickness measuring device 14, countersink depth measuring device 19, seamed portion width measuring device 12 and can height measuring device 17. In the seamed portion thickness measuring device 14, with retraction of the air cylinder 50 the L-shaped slide block 55, and hence the measurement block 16 secured to the slide block 55, is guided along the rail 62 for movement through the notch 47 of the measurement base 11 toward to flat surface 15a of the reference block 15 to clamp the seamed portion 3 of the can 5 between the flat surface 15a of the reference block 15 and the measurement block 16. Thus, even if the can 5 is not brought into complete contact with the flat surface 15a, it is moved to the correct position by the measurement block 16 with the seamed portion 3 in linear contact with the flat surface 15a. Consequently, the distance between the flat surface 15a and the block 16, i.e., the thickness T of the seamed portion, is measured by the magnetic scale unit 51. In the seamed portion width measuring device 12, similar to the seamed portion thickness measuring structure 14, the L-shaped slide block 55' is guided along the rail 62' with retraction of the air cylinder 50', thus vertically lowering the measurement pin 13 secured to the slide block 55' to clamp the seamed portion 3 between the measurement pin 13 and the measurement base 11. At the same time, in the can height measuring device 17, the measurement member 18 is lowered with extension of the rod 40 of the air cylinder 38 to bring the lower surface of the measurement member 18 into contact with the can 5. In this state, the contact point between the measurement pin 13 of the seamed portion width measuring device 12 and the seamed portion 3, the contact point between the flat surface 15a of the reference block 15 and the seamed portion 3, the contact point between the measurement block 16 of the seamed portion thickness measuring device 14 and the seamed portion 3, and the contact point between the lower surface of the measurement member 18 of the can height measuring device 17 and the can 5 are all found in the same diametrical plane of the can 5. The magnetic scale units 39, 51 and 51' measure the gaps of the portions held clamped in the above manner, and provide signals as outputs representing the seamed portion thickness T, seamed portion width W and can height H to the respective measurement units 35a to 35c. Since the portions clamped in the above manner are found in the same plane, it is possible to obtain accurate correlation among the measurement values of the seamed portion thickness T, seamed portion width W and can height H of the can 5.

Meanwhile, in the countersink depth measuring device 19, the accordion portion 25 is extended by air supplied from the ductline 24, causing the measurement member 21, which is tiltable by the pivot bearing 23, to be raised along the inner side of the seamed portion 3 of the can 5. When the free end of the measurement member 21 is brought into contact with the deepest portion of the countersink 4 of the can end, it can no longer be displaced, and thus ceases to rise. The distance the measurement member 21 is raised is measured by the magnetic scale unit of the device 19. The scale unit provides a signal representing the countersink depth C to be transmitted through the cable 26 to the measurement unit 35d. In the above manner, the countersink depth measuring device 19 measures the countersink depth at a position spaced a constant distance from the position of measurement of the thickness T and width W of the seamed portion. Since the through hole 20 bored in the measurement base 11 is fixed in position, i.e., it is not moved, measurement is at a fixed position along the can seam at all times so long as the cans being measured are of the same type. This means that the measurement value of the countersink depth can be obtained at fixed phase difference at all times with respect to each of the measurement values of the seamed portion thickness T, seamed portion width W and can height H. The individual measurement values thus can be compared with each other by correlating them. It is thus possible to not only accurately judge the seamed portion as to whether or not it is good, but to also readily determine and eliminate the cause of a defectiveness of one of the measurement values, if judged so, in correlation to the other measurement values. Further, since the countersink depth measuring device 19 is provided in the vicinity of the place of measurement of the thickness T and width W of the seamed portion, and the end of its measurement member 21 is substantially tiltable in the radial direction of the can being measured, it is possible to measure the countersink depth of a can having any diameter. This is so because the position of the seamed portion is not greatly deviated in the vicinity of the place of measurement of the thickness T and width W of the seamed portion irrespective of the size of the can under measurement. The deviation, if any, can be made up for by tilting the measurement member 21 tiltable substantially in the radial direction of the can.

The measurement unit 35 measures the seamed portion thickness T, seamed portion width W, can height H and countersink depth C from signals transmitted from the respective magnetic scale units and transmits the results to the computer 34. The computer 34, after receiving and recording the transmitted measurement values, operates the air cylinders to return the measurement pin 13 of the seamed portion width measuring device 12, the measurement block 16 of the seamed portion thickness measuring device 14 and the measurement member 18 of the can height measuring device 17 to the positions shown by the imaginary lines in FIG. 1 so that the can be removed from the measurement base. The free end of the measurement member 21 of the countersink depth measuring device 19 is moved to a predetermined position, at which the end slightly projects above the upper surface of the measurement base 11. When the can 5 has been removed in this manner, the individual devices are ready for a measurement of the next can. At the same time, the computer 34 judges whether or not the measurement values are good, and transmits the results, along with the measurement values, to the storage unit 33 and display unit 31. This brings an end to the overall measurement with respect to a single can.

What is claimed is:

1. An apparatus for measuring the size of a seamed portion of a can, comprising:

a measurement base for receiving a can on an upper surface thereof;

a reference member connected to said measurement base, said reference member including a reference contact portion projecting above said upper surface of said measurement base for contacting an outer surface of said seamed portion of said can;

width measuring means mounted on said reference member for measuring the width of said seamed portion of said can, said width measuring means including a width measurement member mounted above said reference contact portion of said reference member and so as to be movable toward said measurement base to contact said seamed portion of said can and clamp said seamed portion with said measurement base to thereby measure the width of said seamed portion; and thickness measuring means mounted on said reference member for measuring the thickness of said seamed portion of said can, said thickness measuring means including a thickness measurement member projecting above said upper surface of said measurement base and mounted so as to be movable toward said reference contact portion of said reference member to contact said seamed portion of said can and clamp said seamed portion with said reference contact portion to thereby measure the thickness of said seamed portion;

wherein the contact point between said width measurement member and said seamed portion of said can lies in the same vertical plane as the contact point between said thickness measurement member and said seamed portion and the contact point between said reference contact portion and said seamed portion, whereby the width and thickness of said seamed portion are measured on the same radius of said can.

2. The apparatus of claim 1, wherein said measurement base is disposed horizontally and is provided with a slit-like notch, said thickness measuring member projecting above said upper surface of said measurement base through said slit-like notch and movable in said slit-like to contact said seamed portion of said can.

3. The apparatus of claim 2, wherein said reference contact portion of said reference member includes a contact surface for contacting said seamed portion of said can, said contact surface inclined at angle with respect to said measurement base substantially equal to the angle of inclination of said seamed portion of said can, said reference member connected to said measurement base so as to dispose the reference contact portion adjacent to and on the longitudinal center line of said slit-like notch, whereby said seamed portion of said can can be accurately clamped and measured between said thickness measuring member moving in said slit-like notch and said reference contact portion adjacent said slit like notch.

4. The apparatus of claim 1, wherein said thickness measuring member is a pin mounted so as to be vertically movable.

5. An apparatus for measuring the size of a seamed portion of a can, comprising:
a horizontally disposed measurement base for receiving a can to be measured on an upper surface thereof, said measurement base including a slit-like notch across which the seamed portion of said can is disposed upon measurement;
a reference member connected to said measurement base, said reference member including a reference contact portion projecting above said upper surface of said measurement base, said reference contact portion having a contact surface for contacting an outer surface of said seamed portion of said can, said contact surface inclined at an angle with respect to said measurement base substantially equal to the angle of inclination of said seamed portion of said can, said reference member connected to said measurement base so as to dispose the reference contact portion adjacent to and on the longitudinal center line of said slit-like notch;
width measuring means mounted on said reference member for measuring the width of said seamed portion of said can, said width measuring means including a width measurement member vertically movably mounted above said reference contact portion of said reference member so as to be movable toward said measurement base to contact said seamed portion of said can and clamp said seamed portion with said measurement base to thereby measure the width of said seamed portion;
thickness measuring means mounted on said reference member for measuring the thickness of said seamed portion of said can, said thickness measuring means including a thickness measurement member projecting above said upper surface of said measurement base through said slit-like notch and mounted so as to be movable in said slit-like notch toward said reference contact portion of said reference member to contact said seamed portion of said can and clamp said seamed portion with said reference contact portion to thereby measure the thickness of said seamed portion; and
height measuring means mounted on said measurement base for measuring the height of said can, said height measuring means including a vertically movably mounted height measurement member having a lower surface for contacting and measuring the height of said can;
wherein the contact point between said width measurement member and said seamed portion of said can, the contact point between said thickness measurement member and said seamed portion, the contact point between said contact surface of said reference contact portion and said seamed portion, and the contact point between said lower surface of said height measurement member and said can all lie in the same vertical plane, whereby the width and thickness of said seamed portion and the height of said can are measured at the same radius of said can.

6. An apparatus for measuring the size of a seamed portion of a can, comprising:
a horizontally disposed measurement base for receiving a can to be measured on an upper surface thereof, said measurement base including a slit-like notch and a through hole adjacent said slit-like notch, across both of which the seamed portion of said can is disposed upon measurement;
a reference member connected to said measurement base, said reference member including a reference contact portion projecting above said upper surface of said measurement base, said reference contact portion having a contact surface for contacting an outer surface of said seamed portion of said can, said contact surface inclined at an angle with respect to said measurement base substantially equal to the angle of inclination of said seamed portion of said can, said reference member connected to said measurement base so as to dispose said reference contact portion adjacent to and on the longitudinal center line of said slit-like notch;
width measuring means mounted on said reference member for measuring the width of said seamed portion, said width measuring means including a width measurement member vertically movably mounted above said reference contact portion of said reference member so as to be movable toward said measurement base to contact said seamed portion of said can and clamp said seamed portion with said measurement base to thereby measure the width of said seamed portion;
thickness measuring means mounted on said reference member for measuring the thickness of said seamed portion of said can, said thickness measuring means including a thickness measurement member projecting above said upper surface of said measurement base through said slit-like notch and mounted so as to be movable in said slit-like notch toward said reference contact portion of said reference member to contact said seamed portion of said can and clamp said seamed portion with said reference contact portion to thereby measure the thickness of said seamed portion; and
countersink measuring means mounted on a lower surface of said measurement base for measuring the depth of a countersink of said seamed portion of said can, said countersink measuring means including a countersink measurement member mounted so as to be tiltable and vertically movable through said through hole of said measurement base, whereby said countersink measurement member is projected above said measurement base through said through hole to contact said countersink of said seamed portion of said can to thereby measure the depth of said countersink;

wherein the contact point between said width measurement member and said seamed portion of said can, the contact point between said thickness measurement member and said seamed portion, and the contact point between said contact surface of said reference contact portion and said seamed portion all lie in the same vertical plane, whereby the width and thickness of said seamed portion are measured at the same radius of said can.

7. The apparatus as set forth in claim 6, wherein said countersink measuring means is disposed on said lower surface of said measurement base near said reference contact portion of said reference member but without obstructing the movement of said thickness measurement member of said thickness measuring means.

8. An apparatus for measuring the size of a seamed portion of a can, comprising:

a horizontally disposed measurement base for receiving a can to be measured on an upper surface thereof, said measurement base including a slit-like notch and a through hole adjacent said slit-like notch, across both of which the seamed portion of said can is disposed upon measurement;

a reference member connected to said measurement base, said reference member including a reference contact portion projecting above said upper surface of said measurement base, said reference contact portion having a contact surface for contacting an outer surface of said seamed portion of said can, said contact surface inclined at an angle with respect to said measurement base substantially equal to the angle of inclination of said seamed portion of said can, said reference member connected to said measurement base so as to dispose said reference contact portion adjacent to and on the longitudinal center line of said slit-like notch;

width measuring means mounted on said reference member for measuring the width of said seamed portion, said width measuring means including a width measurement member vertically movably mounted above said reference contact portion of said reference member so as to be movable toward said measurement base to contact said seamed portion of said can and clamp said seamed portion with said measurement base to thereby measure the width of said seamed portion;

thickness measuring means mounted on said reference member for measuring the thickness of said seamed portion of said can, said thickness measuring means including a thickness measurement member projecting above said upper surface of said measurement base through said slit-like notch and mounted so as to be movable in said slit-like notch toward said reference contact portion of said reference member to contact said seamed portion of said can and clamp said seamed portion with said reference contact portion to thereby measure the thickness of said seamed portion;

countersink measuring means mounted on a lower surface of said measurement base for measuring the depth of a countersink of said seamed portion of said can, said countersink measuring means including a countersink measurement member mounted so as to be tiltable and vertically movable through said through hole of said measurement base, whereby said countersink measurement member is projected above said measurement base through said through hole to contact said countersink of said seamed portion of said can to thereby measure the depth of said countersink; and height measuring means mounted on said measurement base for measuring the height of said can, said height measuring means including a vertically movably mounted height measurement member having a lower surface for contacting and measuring the height of said can;

wherein the contact point between said width measurement member and said seamed portion of said can, the contact point between said thickness measurement member and said seamed portion, the contact point between said contact surface of said reference contact portion and said seamed portion, and the contact point between said lower surface of said height measurement member and said can all lie in the same plane, whereby the width are thickness of said seamed portion and the height of said can are measured at the same radius of said can.

* * * * *